Jan. 21, 1958 H. RUDOFF ET AL 2,820,914
DYNAMOELECTRIC MACHINE STRUCTURES
Filed Aug. 31, 1954
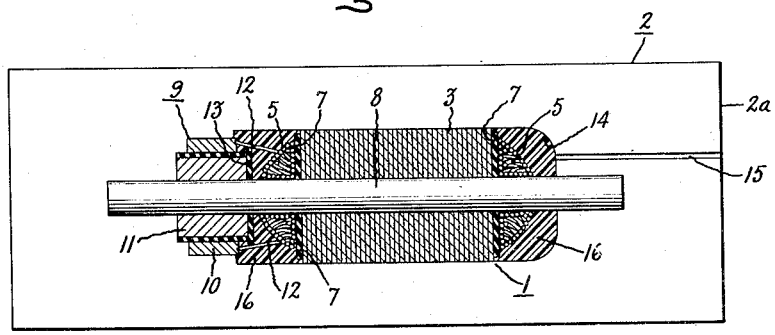
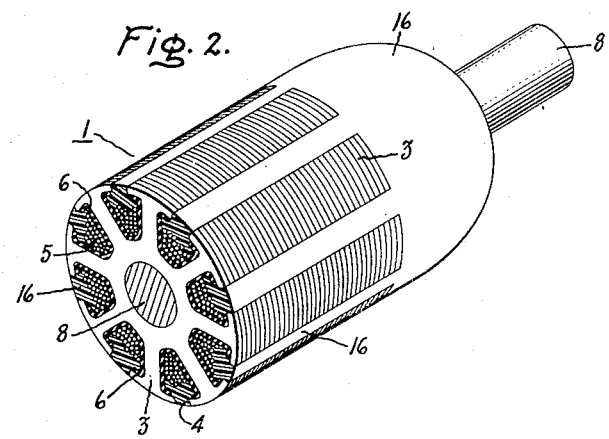
Inventors:
Hyman Rudoff,
Thomas J. Jordan,
by Merton D. Munn
Their Attorney.

United States Patent Office 2,820,914
Patented Jan. 21, 1958

2,820,914

DYNAMOELECTRIC MACHINE STRUCTURES

Hyman Rudoff, Schenectady, and Thomas J. Jordan, Amsterdam, N. Y., assignors to General Electric Company, a corporation of New York Application August 31, 1954, Serial No. 453,268

8 Claims. (Cl. 310—43)

Our invention relates to structures for dynamoelectric machinery. More particularly, our invention relates to improved dynamoelectric machine structures which are characterized by improved operating characteristics and serviceability.

The manufacture of rotors and stators for dynamoelectric machinery, involving proper placement, insulation, and protection of windings of conductors or wire requires a great deal of expense and care. Normally the rotor or armature comprises a shaft-mounted magnetic core, which is usually of laminated construction, having therein a plurality of longitudinal winding slots to receive electrical conductor or wire windings which may be connected to a commutator, if the latter is used, in the well-known manner. The winding slots are generally insulated and insulating wedges or topsticks are inserted into the slots to hold the windings in place. Another usual practice is to provide binding wire or bands around the end turns of the windings or coils which extend beyond the ends of the core to hold such end turns in place when the assembly is rotating. When the rotor has been completed, that part of it including the windings is normally further insulated. One method of insulating has been to dip the structure in a liquid resin or varnish which coats the conductors in the windings and curing.

Another method of insulating rotary members for such machines involves casting the entire members or parts of members in a resin which is then solidified. This method has been used to eliminate the need for otherwise securely fixing or wedging the windings in place in their slots.

An object of our invention is to effect certain improvements in such structures whereby a more rigid composite structure is produced capable of satisfactory operation at high speeds, whereby the use of the usual wedging means for securing the coils in place is avoided, whereby the heat transfer and heat resistance characteristics of the devices is improved, and whereby certain other advantages are secured.

A further object of our invention is to provide a single rugged construction and one which may be readily and economically constructed in mass production.

Briefly, our invention with relation to rotor or armature elements comprises fabricating a shaft-mounted magnetic core in the usual manner, with a commutator if desired, placing the core windings loosely in the core winding slots without special means to hold them in place, and impregnating and covering the structure with a polyester resin which is filled with glass fibers and a material such as divided mica, silica, and alumina. There is provided thereby an armature and the like which is simple, has improved heat transfer characteristics, and is physically resistant to heat and forces exerted on it during use. Likewise, there is provided when our process is applied to stator or field coils, structures having like characteristics.

The features of our invention which we believe to be novel are set forth with particularity in the appended claims. Our invention, itself, however, both as to its organzation and method of operation, together with further objects and advantages thereof may best be understood by reference to the following description taken in connection with the accompanying drawing in which Fig. 1 illustrates means for carrying out our invention and Fig. 2 is a cross-sectional view of a completed armature.

Referring to the drawing there is shown a cross-sectional view of an armature 1 as placed in a mold for treatment. Armature 1 comprises a normally laminated magnetic core 3, formed therein a plurality of slots 4 adapted to receive windings 5 of conductors or wire which have a thin insulating coating of varnish or resin not shown. Some means such as slot liners 6 are utilized to insulate and separate the windings 5 from the core 3. This feature is best shown in Fig. 2. Core 3 may be held in place by insulating end punchings 7 and is mounted on a shaft 8. While windings 5 are shown in the drawing as made up of many unconfined conductors, it will be realized that especially in larger machines such windings may be made up of few, or even one, heavy conductors which are individually insulated. Such windings are familiar to those skilled in the art. It will be noted that no particular means other than the normal tension exerted on the windings 5 in wrapping them around the ends of the core are provided to secure them in place within the slots 4.

A commutator 9 may be provided, as required, which is constructed in any well-known manner as, for example, of circumferentially-arranged metal segments 10, separated by insulating strips, not shown, to provide a current transmitting surface. The segmented structure is mounted on an insulating hub 11. Pairs 12 of winding conductors or wires are suitably crimped or otherwise connected to proper segments 10 and may be supported if desired by an insulating disk 13.

Mold 2, one-half 2a of which is shown, may be made in any of a number of configurations known to those skilled in the art. The useful embodiment partially shown in Fig. 1 is in two similar mating parts, the side elevation of one part 2 being shown with a mold cavity 14 to receive one-half of the shaft, core, and commutator structure, the mold cavity surface being contiguous to the cummutator surface and the core periphery with spaces left about the winding end turns and between the commutator 9 and core 3. An orifice 15 is provided in the mold, in this particular case at the mold parting line to introduce a resinous composition into the mold cavity 14.

With the armature 1 in place in the mold part 2 and another mating part not shown placed over this part and secured to fully enclose armature 1, the thermosetting resinous composition is introduced through orifice 15 preferably by the method known as transfer molding though other methods may be used. In this method the material to be molded is heated under pressure and forced by this pressure through an orifice as 15 into a closed mold of which that shown is exemplary. The resinous material 16 fills the mold and all spaces within the armature. The material is retained in the mold under heat until the material has cured or solidified. Preferably pressure is maintained during the curing process. The material flows under pressure into intimate physical and thermal contact with all parts of the armature structure filling all interstices and spaces and presenting a smooth outer surface around the structure conforming to the mold cavity surface. The mold configuration may, of course, be changed to suit any particular requirement. For example, resin compositions may be molded around the whole commutator structure and the resin removed to expose just the outer periphery of the segments 10.

The resinous composition which we have found useful in making our improved structure is a thermosetting polyester resin, which is filled with, or to which is added, glass fiber and a material such as mica, silica, and alumina. Any of the usual polyester resins may be used. Such resins are well-known in the art and are prepared, for example, by the reaction of unsaturated or saturated polycarboxylic acids, unsaturated monocarboxylic acids, or their derivatives with unsaturated alcohols or hydroxy substituted acids. Phthalic acid and anhydride, maleic anhydride or acid and diglycollic acid are typical of those acidic constituents which may be used. Allyl alcohol and ethylene glycol are typical of the alcohols which may be utilized. Styrene, vinyl acetate or similar materials are sometimes added to provide varying characteristics.

Polyester resin compositions which we have found useful comprise from 20 parts to 90 parts by weight polyester resin, 2 parts to 70 parts by weight glass fiber, and from 5 parts to 70 parts by weight of divided mica, silica, or alumina or mixtures thereof. The preferred range of composition for our material from which we secure optimum desirable characteristics is for the resin 40 parts to 75 parts by weight; for the glass fiber, 2 parts to 50 parts by weight, and for the divided mica, silica, or alumina from 5 parts to 50 parts by weight.

The specific percentage composition which provides the best characteristics for our purpose comprises by weight about 60 parts polyester resin, about 4 parts glass fiber, and about 36 parts divided mica, silica, or alumina.

A catalyst is added to the resin to activate it or cause it to cure. This material may be added in varying amounts, for example, from about 0.125% to 5% by weight based on the weight of the resin may be used. Preferably, however, from about 0.125% to 2% by weight are used. An accelerator to further facilitate the cure may also be used in the amount of up to about 2% of the weight of the resin.

The catalysts used for polyester resins are well-known and are usually of the peroxide type. Lauryl and benzoyl peroxides and t-butyl hydroperoxide are typical catalysts. In some cases the peroxide is blended with other materials, for example, in equal proportions with tricresyl phosphate. The accelerator, which may or may not be used as desired, is typically of a cobalt type such as cobalt naphthenate.

For smaller size armatures of the order of one inch diameter glass fibers having an average maximum length of not more than about one-half inch are preferred in the starting mix. During mixing the fibers are reduced to a maximum average length of about one thirty-second inch which provides desired strength qualities to the final molded product but at the same time does not impede the flow of the resin throughout the member to be treated. For larger parts or for those having few interstices and partially enclosed spaces, glass fibers of greater length are useful.

Divided mica, silica, and alumina have been found to be the most desirable filling agents to be used in conjunction with the glass fibers to enhance the heat transfer qualities of the encased parts and increase their strength. We have found that such materials of sizes from 100 to 300 mesh are suitable. The preferred size is 200 mesh. These materials may be used singly or in mixtures.

In preparing the molding composition for use, the resin, including catalyst and accelerator if any, filler, such as mica, silica, and alumina, and glass fiber, are placed in a mixer such as an ordinary dough mixer. Preferably, a mold release agent such as carnauba wax, beeswax, or any other composition for such purpose in the amount of about 2% based on the resin weight is added to facilitate release of the molded part from the mold after curing. A cooling jacket is used to maintain the mix temperature at from about 20° C. to 0° C. Any temperature below about 20° C. is suitable, such temperature preventing any curing of the composition. The ingredients are mixed until a homogeneous mass is obtained which typically has a putty-like consistency. Normally this takes about one-half hour.

The resulting molding composition is forced into the mold and cured, preferably by the well-known transfer molding process which is simple and rapid. In this process the molding composition is heated under pressure and forced into the mold where it is cured by heat, preferably under pressure. We may use temperatures during the molding process of from 180° F. to 300° F. and pressures of from 150 pounds per square inch to 250 pounds per square inch depending on the temperature. We prefer, however, to use a temperature of about 220° F. and a pressure of about 200 pounds per square inch. Under these conditions the cure is completed in about two minutes, when the part may be removed from the mold. At lower temperatures the time will be longer, while it will be shorter under higher temperatures. The pressure applied during the curing process serves to maintain the composition in intimate contact with all parts.

By means of the pressure used in forcing the material into the mold and exerted during the cure the material penetrates all parts of the armature or other parts filling all interstices and spaces and coming into intimate physical and thermal contact with the entire structure. However, there is at these pressures no distortion of the parts.

Armatures and other dynamoelectric machine parts treated according to our invention are characterized by simplicity of structure, in that parts such as topsticks or winding wedges are eliminated. The saving in material, parts, and labor is substantial.

Such molded parts are also greatly improved in heat transfer qualities. For example, an armature molded according to this invention was compared with one which has been dipped in the usual manner in a phenolic varnish. Under exactly similar operating conditions starting at an initial armature temperature of 82° F., after fifteen minutes of operation at 90 watts load, the regular dipped armatures had an average temperature of about 253° F. while armatures made according to our invention had a final average temperature of only about 202° F., a difference of over 50° F.

When standard dipped armatures and our molded armatures were placed in motor assemblies having similar louvered housings and run at 90 watts load until the temperature became constant, the temperature of the air just inside the housing louvers of the standard motor was about 93° F., whereas with our improved armature it was only about 84° F. The air exhaust at the louvers for the standard motor was about 167° F., while for our new armature it was only about 140° F. The field temperature for the improved motor was lower by about 43° F.

Not only is our invention an improvement over standard dipped dynamoelectric machine parts, but it represents a desired advance over resin-containing compositions containing other fillers such as talc. When talc is substituted for mica, alumina, or silica in our molding composition, the desirable characteristics are reduced drastically. For example, when talc was used in place of our materials, a small armature run in a motor for two minutes at 30,000 R. P. M. exhibited cracks whereas our improved armature exhibited no cracks under the same conditions. When our same improved armature was run for 235 hours more at 22,000 R. P. M. there was no sign of cracking. When run at 90 watts load at about 15,000 R. P. M. for fifteen minutes, the armature molded with a glass fiber-talc filled composition ran at about 240° F. compared to about 202° F. for the present armature or not much better than the regular standard dipped armatures which ran at about 253° F.

The improved armature has further been repeatedly cycled from −65° F. to 135° F. without failure or cracking. A motor having such an armature was deliberately overheated until the solder used in the structure melted at about 480° F. Even then our molding composition merely darkened slightly and showed hairline cracks.

It will be seen that we have provided a new and improved dynamoelectric machine member which is simpler in structure and to manufacture, eliminates special means to hold winding coils in place, improves the heat transfer characteristics of the armature and, hence, its life and its ability to operate at higher temperatures. The strength of the armature and its resistance to centrifugal force is also greatly enhanced.

Although we have pointed out that our invention simplifies the structure of such dynamoelectric machine members as an armature by eliminating such parts as slot wedges, it will be apparent that slot wedges and other conventional parts may be used if desired. In such cases the other advantages of our invention are still available.

While we have described our invention with respect specifically to an armature, it will be realized that the advantages thereof may also be gained by its application to the stator coils of a motor as well.

What we claim as new and desire to secure by Letters Patent of the United States is:

1. A member for a dynamoelectric machine comprising a magnetic core, a winding on said core, and a material in intimate contact with all parts of said member, said material comprising a polyester resin filled with glass fiber and a material selected from the class consisting of mica, silica, alumina, and mixtures thereof.

2. A member for a dynamoelectric machine comprising a core of magnetic material, windings on said core, a material surrounding and filling all spaces in said member, said material comprising by weight from about 20 parts to 90 parts polyester resin, from about 2 parts to 70 parts glass fiber, and from about 5 parts to 70 parts of a material chosen from the class consisting of mica, silica, alumina, and mixtures thereof.

3. A member for a dynamoelectric machine comprising a core of magnetic material, windings on said core, a material filling all spaces in said member, and substantially surrounding said member, said material comprising by weight from about 20 parts to 90 parts polyester resin, from about 2 parts to 70 parts glass fiber, and from about 5 parts to 70 parts of a material chosen from the class consisting of mica, silica, alumina, and mixtures thereof.

4. A member for a dynamoelectric machine comprising a core of magnetic material, windings on said core, a material surrounding and in intimate contact with all parts of said member except the outer periphery of said core, said material comprising by weight from about 20 parts to 90 parts polyester resins, from about 2 parts to 70 parts glass fiber, and from about 5 parts to 70 parts of a material chosen from the class consisting of mica, silica, alumina, and mixtures thereof.

5. A member for a dynamoelectric machine comprising a core of magnetic material, windings on said core, a material surrounding and filling all spaces in said member, said material comprising by weight from about 40 parts to 75 parts polyester resin, from about 2 parts to 50 parts glass fiber, and from about 5 parts to 50 parts of a material chosen from the class consisting of mica, silica, alumina, and mixtures thereof.

6. A member for a dynamoelectric machine comprising a core of magnetic material, windings on said core, a material filling all interstices in said member and substantially surrounding said member, said material comprising by weight from about 40 parts to 75 parts polyester resin, from about 2 parts to 50 parts glass fiber, and from about 5 parts to 50 parts of a material chosen from the class consisting of mica, silica, alumina, and mixtures thereof.

7. A member for a dynamoelectric machine comprising a core of magnetic material, windings on said core, a material surrounding and in intimate contact with all parts of said member except the outer periphery of said core, said material comprising by weight from about 40 parts to 75 parts polyester resin, from about 2 parts to 50 parts glass fiber, and from about 5 parts to 50 parts of a material chosen from the class consisting of mica, silica, alumina, and mixtures thereof.

8. A member for a dynamoelectric machine comprising: a core formed of magnetic material and having winding slots formed therein; windings in said slots; and a mass of solidified polyester resin containing glass fibers and a material selected from the class consisting of mica, silica, alumina and mixtures thereof filling said slots and encasing said windings so as to secure said windings in said slots and improve the heat transfer characteristics of said member.

References Cited in the file of this patent

UNITED STATES PATENTS

| | | |
|---|---|---|
| 1,921,112 | Apple | Aug. 8, 1933 |
| 2,318,786 | Korte et al. | May 11, 1943 |
| 2,632,752 | Anderson | Mar. 24, 1953 |
| 2,648,018 | Meier | Aug. 4, 1953 |
| 2,667,465 | Nebesar | Jan. 26, 1954 |

OTHER REFERENCES

"Ethoxylines, a New Group of Triple-Function Resins" in Electrical Manufacturing for July 1949, pp. 78–81, 164 and 166.